(12) United States Patent
Shikii et al.

(10) Patent No.: US 7,643,194 B2
(45) Date of Patent: Jan. 5, 2010

(54) IMAGE FORMING APPARATUS

(75) Inventors: Shinichi Shikii, Nara (JP); Hiroyuki Furuya, Nara (JP); Kiminori Mizuuchi, Osaka (JP); Tatsuo Itoh, Osaka (JP); Tetsuro Mizushima, Osaka (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 11/898,306

(22) Filed: Sep. 11, 2007

(65) Prior Publication Data
US 2008/0174845 A1    Jul. 24, 2008

(30) Foreign Application Priority Data
Sep. 12, 2006    (JP)    ............................. 2006-246493

(51) Int. Cl.
*G02B 26/08*    (2006.01)
(52) U.S. Cl. ................................... 359/216.1
(58) Field of Classification Search ... 359/216.1–218.1; 347/241
See application file for complete search history.

(56) References Cited

U.S. PATENT DOCUMENTS 6,072,519 A * 6/2000 Griffith et al. ............... 347/241
6,151,056 A * 11/2000 Araki .......................... 347/246

FOREIGN PATENT DOCUMENTS

JP    11-64789    3/1999
JP    2005-99160    4/2005

* cited by examiner

*Primary Examiner*—Euncha P Cherry
(74) *Attorney, Agent, or Firm*—Wenderoth, Lind & Ponack, L.L.P.

(57) ABSTRACT

An image forming apparatus includes plural laser light sources, a polygonal mirror that scans plural laser beams from the plural laser light sources, and a multiplexing member that combines the plural laser beams scanned by the polygonal mirror. The polygonal mirror is disposed above or below the multiplexing member, and the extension of the rotation axis of the polygonal mirror passes through the multiplexing member. When configured in this manner, it is possible to reduce the apparatus size and speckle noises caused by the plural laser beams.

15 Claims, 6 Drawing Sheets

IMAGE FORMING APPARATUS

BACKGROUND OF THE INVENTION

1. Field of the Invention

The present invention relates to an image forming apparatus, such as a projector, that uses light sources for plural colors including red (R), green (G), and blue (B).

2. Background Art

A display, such as a projector that projects an image onto a screen, has been known. The main stream has been a type using a high pressure mercury-vapor lamp as the light source. However, a laser display using a laser as the light source is being studied in recent years. Using red (R), green (G), and blue (B) lasers as the light sources is advantageous in many respects, for example, a color reproducible range is broadened markedly to the extent that color representation close to original colors is enabled and low power consumption can be achieved.

Of the needs for a projector, one need is to reduce the projector to a portable size so as to be carried around. In addition, in a case where lasers are used as the light sources, speckle noises, which give a problem in image quality, are known to occur. To satisfy the needs and eliminate the problems as above, proposals have been made, for example, in JP-A-2005-99160 and JP-A-11-64789.

However, JP-A-2005-99160 achieves a reduction of the apparatus size by making the lasers compact on one hand, but it has a problem that the cost is increased on the other. Further, because JP-A-11-64789 removes the speckle noises by providing the configuration to remove speckle noises separately for each of the R, G, and B light sources, it has a problem that the apparatus size is undesirably increased.

SUMMARY OF THE INVENTION

An object of the invention is to provide an image forming apparatus that achieves a reduction of both the apparatus size and speckle noises at the same time by a simple and inexpensive configuration.

An image forming apparatus in an aspect of the invention includes: plural laser light sources; a polygonal mirror that scans plural laser beams from the plural laser light sources; and a multiplexing member that combines the plural laser beams scanned by the polygonal mirror, wherein an extension of a rotation axis of the polygonal mirror passes through the multiplexing member.

With the image forming apparatus configured as above, it is possible to achieve a significant reduction of the apparatus size by the layout in which the extension of the rotation axis of the polygonal mirror that scans laser beams from the plural laser light sources passes through the multiplexing member. Further, by scanning plural laser beams by a single polygonal mirror, it is possible to remove speckle noises caused by plural laser beams efficiently without interfering with a reduction of the apparatus size.

DETAILED DESCRIPTION OF THE PREFERRED EMBODIMENTS

Hereinafter, embodiments of the invention will be described with reference to the drawings. Like components are labeled with like reference numerals, and descriptions of those labeled with like reference numerals in the drawings may be omitted where appropriate.

First Embodiment

Figure 1:
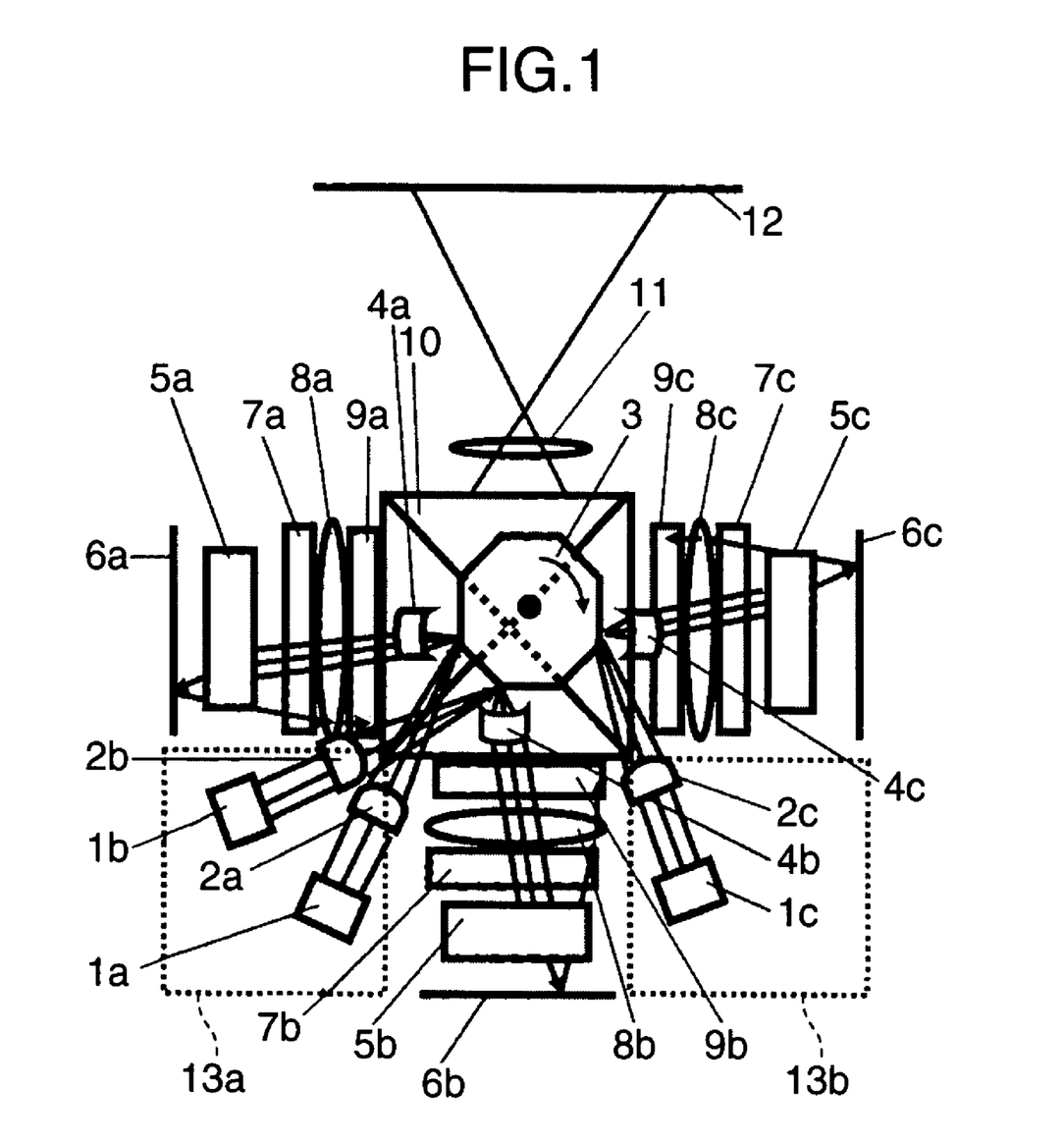
FIG. 1 is a top view schematically showing the configuration of an image forming apparatus according to a first embodiment of the invention.
Figure 2:
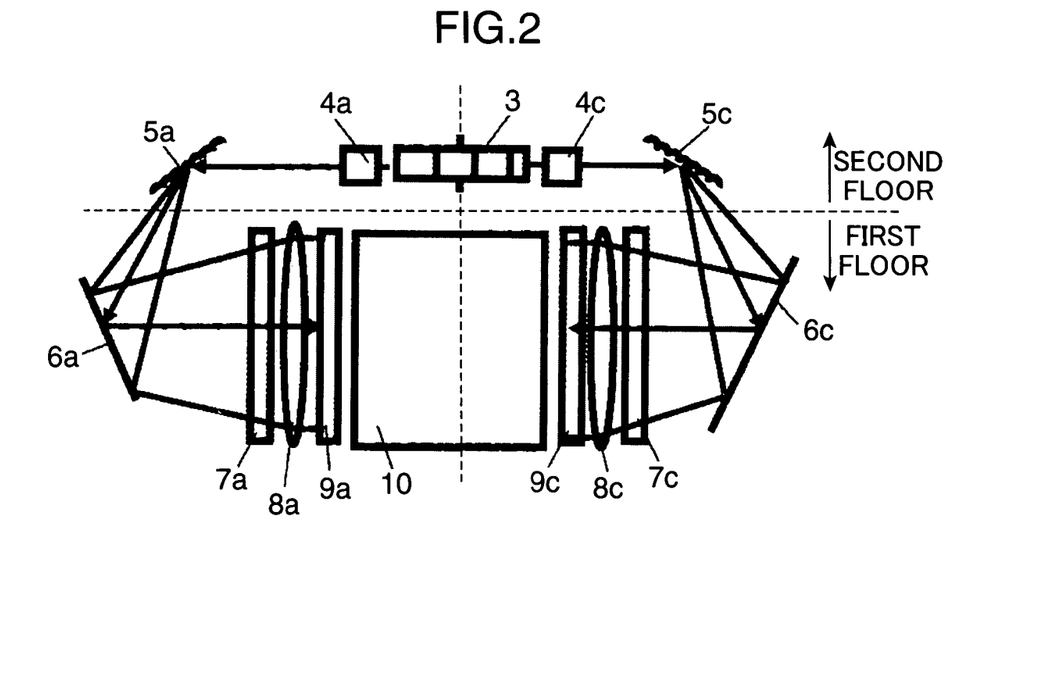
FIG. 2 is a side view schematically showing the configuration of the image forming apparatus according to the first embodiment of the invention.

FIG. 1 is a top view schematically showing the configuration of an image forming apparatus according to a first embodiment of the invention. FIG. 2 is a side view of the image forming apparatus. Hereinafter, a mechanism for operations of the image forming apparatus of this embodiment will be described using FIG. 1 and FIG. 2. The optical system in the image forming apparatus of this embodiment is provided with plural laser light sources including a B light source 1a, a G light source 1b, and an R light source 1c, cylindrical lenses 2a, 2b, and 2c corresponding to the B light source 1a, the G light source 1b, and the R light source 1c, respectively, a polygonal mirror 3, cylindrical lenses 4a, 4b, and 4c, cylindrical mirror arrays 5a, 5b, and 5c, mirrors 6a, 6b, and 6c, diffusers 7a, 7b, and 7c, field lenses 8a, 8b, and 8c, spatial light modulators 9a, 9b, and 9c, and a multiplexing member 10. As with the cylindrical lenses 2a, 2b, and 2c, the cylindrical lenses 4a, 4b, and 4c, the cylindrical mirror arrays 5a, 5b, and 5c, the mirrors 6a, 6b, and 6c, the diffusers 7a, 7b, and 7c, the field lenses 8a, 8b, and 8c, and the spatial light modulators 9a, 9b, and 9c correspond to the B light source 1a, the G light source 1b, and the R light source 1c, respectively.

As is shown in FIG. 2, the optical system in the image forming apparatus of this embodiment has a two-story structure in which the polygonal mirror 3 is disposed above the multiplexing member 10. More specifically, the laser light sources 1a, 1b, and 1c, the cylindrical lenses 2a, 2b, and 2c, the polygonal mirror 3, the cylindrical lenses 4a, 4b, and 4c, and the cylindrical mirror arrays 5a, 5b, and 5c are disposed on the second floor, and the rest are disposed on the first floor. It should be appreciated, however, that this embodiment is not limited to this configuration. For example, the laser light sources 1a, 1b, and 1c, the cylindrical lenses 2a, 2b, and 2c, the polygonal mirror 3, the cylindrical lenses 4a, 4b, and 4c, and the cylindrical lens arrays 5a, 5b, and 5c may be disposed on the first floor and the rest on the second floor. In short, it is sufficient to dispose one of the polygonal mirror 3 and the multiplexing member 10 above or below the other and to dispose the rest of the members in such a manner that laser beams emitted from the laser light sources 1a, 1b, and 1c and scanned by the polygonal mirror 3 are guided to the multiplexing member 10.

Laser beams emitted from the laser light sources 1a, 1b, and 1c go incident on the polygonal mirror 3 in a state converged in the main scanning direction by the corresponding cylindrical lenses 2a, 2b, and 2c. The beams reflected on the reflection surfaces of the polygonal mirror 3 are scanned in the main scanning direction. The main scanning direction referred to herein is defined as the direction of rotary scanning by the polygonal mirror 3. By focusing the beams in the main scanning direction on the polygonal mirror 3, it is possible to minimize shading of the beams in the main scanning direction on the polygonal mirror 3. Accordingly, a polygonal mirror having a small diameter can be used as the polygonal mirror 3, which can in turn reduce the apparatus in size.

Because the beams reflected on the polygon mirror 3 are diverged, they are returned to almost parallel beams by the cylindrical lenses 4a, 4b, and 4c. In this case, it is advantageous to use meniscus lenses having power in the main scanning direction as the cylindrical lenses 4a, 4b, and 4c.

The respective beams changed to almost parallel beams by the cylindrical lenses 4a, 4b, and 4c are reflected on the cylindrical mirror arrays 5a, 5b, and 5c, respectively, and headed toward the mirrors 6a, 6b, and 6c, respectively, disposed on the first floor. Pitches in and curvatures of the cylindrical mirror arrays 5a, 5b, and 5c are set so that the exposure intensity on the spatial light modulators 9a, 9b, and 9c become almost homogeneous in the vertical direction. The beams reflected on the mirrors 6a, 6b, and 6c go incident on the corresponding diffusers 7a, 7b, and 7c and pass through the corresponding diffusers 7a, 7b, and 7c to be diffused in a specific angle range. Subsequently, after the beams are changed to telecentric beams by the corresponding field lenses 8a, 8b, and 8c, they go incident on the corresponding spatial light modulators 9a, 9b, and 9c. The beams spatially modulated by the spatial light modulators 9a, 9b, and 9c are combined for the respective colors, R, G, and B, in the multiplexing member 10. The resulting beam exiting therefrom goes incident on a projection lens 11 for the beam to be projected onto a screen 12 in the form of an image by way of the projection lens 11.

Advantages of the optical system having the cylindrical lenses 2a, 2b, 2c, 4a, 4b, and 4c of this embodiment will now be described. More specifically, in this embodiment, laser beams emitted from the laser light sources 1a, 1b, and 1c are focused in the main scanning direction of the polygonal mirror 3 by the corresponding cylindrical lenses 2a, 2b, and 2c, and the beams reflected on the reflection surfaces of the polygonal mirror 3 are changed again to parallel beams by the corresponding cylindrical lenses 4a, 4b, and 4c and guided to the multiplexing member 10. This embodiment achieves unique effects as follows by focusing beams with the use of the cylindrical lenses 2a, 2b, and 2c and by changing beams to parallel beams with the use of the cylindrical lenses 4a, 4b, and 4c. The unique effects will now be described more concretely.

In a case described herein, assume that a parallel beam diameter of the R light source 1c in the main scanning direction is 2 mm, a distance from the polygonal mirror 3 to the spatial light modulator 9c by way of the cylindrical lens mirror array 5c, the mirror 6c, the diffuser 7c, and the field lens 8c is about 50 mm, and a width of the spatial light modulator 9c in the main scanning direction is 15 mm. An optical system without the cylindrical lenses 2c and 4c of this embodiment will be discussed first.

Under the conditions that neither a beam is focused in the main scanning direction by the cylindrical lens 2c nor the beam is allowed to pass through the cylindrical lens 4c, as many as about 36 surfaces are necessary on the polygonal mirror 3 when a duty ratio during a laser scanning period is maintained at about 90%. Further, given 2 mm as the width of each reflection surface of the polygonal mirror 3 in the main scanning direction, a radius of at least 12 mm is necessary for an inscribed circle to the polygonal mirror 3. The polygonal mirror 3 is thus increased significantly in size. Consequently, the size of the overall apparatus is increased because of the size of the polygonal mirror 3. Suppose that the multiplexing member 10 is a cross prism in the shape of a square prism that measures 20 mm×20 mm×20 mm, the size of the polygonal mirror 3 disposed above or below the cross prism becomes larger than the projection area when the cross prism is viewed from above. The size of the polygon mirror 3 therefore determines the apparatus size.

A case will now be described where the cylindrical lenses 2c and 4c of this embodiment are disposed before and behind the rotary polygonal mirror 3, respectively. In this case, by focusing a beam in the main scanning direction by the cylindrical lens 2c and further allowing the beam to pass through the cylindrical lens 4c, the number of surfaces needed for the polygonal mirror 3 is about 12, which is fewer than those necessary in the case discussed above. Given about 5 mm as a radius of the inscribed circle to the polygonal mirror 3, then each reflection surface of the polygonal mirror 3 has a width of 2 mm or greater in the main scanning direction. Because the beam is focused in the main scanning direction on the polygonal mirror 3, the above is sufficiently a large size for the reflection surface. With the reflection surface of this size, even when the multiplexing member 10 is of the same size as above that measures 20 mm×20 mm×20 mm, the polygonal mirror 3 will not fall outside the projection area. The size of the polygonal mirror 3 therefore does not determine the apparatus size. In addition, a polygonal mirror having about 12 surfaces is mass produced for general-purpose laser printers or the like, and is therefore more advantageous than a 36-surface polygon in terms of availability and cost. Further, by inserting the cylindrical lenses 4a, 4b, and 4c, it is possible to suppress an increase in scanning speed at the right and left scanning ends on the spatial light modulators 9a, 9b, and 9c, which can in turn enhance the homogeneity in exposure in the main scanning direction.

As has been described, by focusing a beam with the use of the cylindrical lens 2c and changing the beam into a parallel beam with the use of the cylindrical lens 4c, the optical system achieves many advantages in terms of space, cost, availability, and homogeneity in exposure. The above has described a case using the system for the R light source 1c, and it should be appreciated that the same applies to each of the G light source 1b and the B light source 1a.

In this embodiment, the cylindrical lenses 2c and 4c having power in the main scanning direction alone are used. It goes without saying, however, that the cylindrical lenses 2c and 4c may be configured to have power also in the thickness direction of the reflection surface depending on the beam diameter in the thickness direction of the polygonal mirror 3 so as to eliminate shading in the thickness direction.

Advantages of the optical system having the polygonal mirror 3 of this embodiment will now be described.

As is disclosed in JP-A-11-64789 described in the background art column above, it is normal to dispose a rotating lenticular lens in the optical path of each of plural light sources as means for removing speckle noises. In this case, because as many motors as the light sources are necessary to rotate lenticular lenses, adopting this means to a compact projector having plural light sources particularly raises a problem in terms of the apparatus size and the cost. Other than lenticular lenses disclosed in JP-A-11-64789 supra, it is generally possible to reduce speckle noises by scanning beams with the use of a galvanometer scanner or the like. Inserting the galvanometer scanner in the optical path of each of plural light sources as in JP-A-11-64789 supra, however, makes a reduction in both size and cost difficult for the same reasons as the lenticular lenses.

On the contrary, according to the polygonal mirror 3 of this embodiment, by allowing plural beams from the plural light sources 1a, 1b, and 1c to go incident on the polygonal mirror 3 from the periphery, it is possible to scan plural beams with the use of the polygonal mirror 3, which is single scanning means. Hence, even when there are plural light sources, it is possible to remove speckle noises without increasing the number of scanning means, which is advantageous in terms of cost and space. Further, with the polygonal mirror 3 of this embodiment, the polygonal mirror 3 and the multiplexing member 10 are disposed in a vertical direction in such a manner that an extension of the rotation axis of the polygonal mirror 3 passes through inside the multiplexing member 10. When configured in this manner, it becomes possible to make optical paths of plural beams from the polygonal mirror 3 to the multiplexing member 10 almost equal. Consequently, because the optical path of each beam has no redundancy, a further significant reduction in size can be achieved.

The positional relation between the polygonal mirror 3 and the multiplexing member 10 of this embodiment will now be described. Herein, a case where a cross prism is used as the multiplexing member 10 will be described. It should be appreciated, however, that this embodiment is not limited to a case where the multiplexing member 10 is a cross prism. For example, respective R, G, and B laser beams may be combined by two dichroic mirrors crossed each other at a specific angle.

Figure 3:
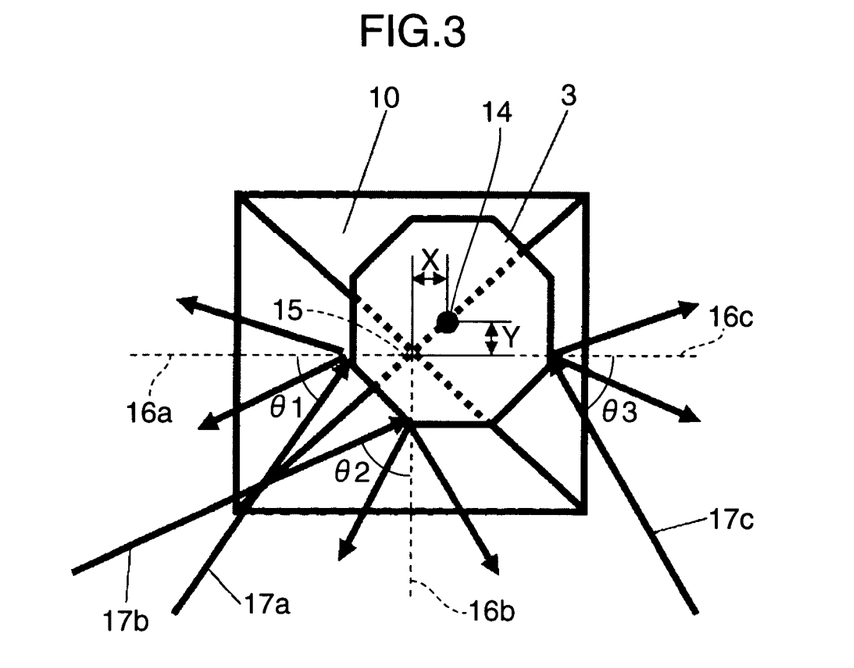
FIG. 3 is a view used to describe the positional relation between a multiplexing member and a polygonal mirror and an angle of incidence of each laser beam going incident on the polygonal mirror.

As is shown in FIG. 1, in the optical system in the image forming apparatus of this embodiment, the respective B, G, and R light sources 1a, 1b, and 1c are disposed within dead spaces 13a and 13b, and this layout makes it possible to save a footprint of the apparatus effectively. By disposing the respective B, G, and R light sources 1a, 1b, and 1c in the dead spaces 13a and 13b, as is shown in FIG. 3, B, G, and R incident beams 17a, 17b, and 17c go incident on the reflection surfaces of the polygonal mirror 3 at specific angles with respect to B, G, and R deflection center directions 16a, 16b, and 16c, respectively. To be more concrete, the incident beam 17a from the B light source 1a goes incident on the reflection surface at an angle of incidence, θ1, with respect to the deflection center direction 16a. The incident beam 17b from the G light source 1b goes incident on the reflection surface at an angle of incidence, θ2, with respect to the deflection center direction 16b. The incident beam 17c from the R light source 1c goes incident on the reflection surface at an angle of incidence, θ3, with respect to the deflection center direction 16c. The incident beams 17a, 17b, and 17c are scanned about the deflection center directions 16a, 16b, and 16c, respectively, owing to the rotations of the polygonal mirror 3. Herein, the respective B, G, and R light sources 1a, 1b, and 1c are disposed in such a manner that the beams reflected on the polygonal mirror 3 in the corresponding deflection center directions 16a, 16b, and 16c are headed toward the centers of the corresponding spatial light modulators 9a, 9b, and 9c. To be more concrete, the respective angles of incidence, θ1, θ2, and θ3, are adjusted. Accordingly, it is sufficient to design the optical system in the latter stage from the polygonal mirror 3 in such a manner that respective beams from the polygonal mirror 3 scan symmetric angles about the corresponding deflection center directions 16a, 16b, and 16c, which makes it easier to design the optical system.

In a case where the angles of incidence, θ1, θ2, and θ3, are adjusted as described above, as is shown in FIG. 3, the rotation center 14 of the polygonal mirror 3 and the center 15 of the cross prism 10 are disposed so that they are displaced from each other by a specific distance. To be more concrete, as is shown in FIG. 3, in a case where B, G, and R incident beams 17a, 17b, and 17c are allowed to go incident on the polygonal mirror 3 from three directions, the rotation center 14 of the polygonal mirror 3 is disposed on the diagonal line of the cross prism 10 at a position displaced by distances X and Y from the center 15 of the cross prism 10.

By displacing the rotation center 14 of the polygonal mirror 3 from the center 15 of the cross prism 10, it becomes necessary to make the diameter of the inscribed circle to the polygonal mirror 3 equal to or shorter than the length and width of the cross prism 10. As has been described above, the diameter of the inscribed circle to the polygonal mirror 3 can be made smaller than the length and width of the cross prism 10 by focusing the incident beams 17a, 17b, and 17c on the polygonal mirror 3 in the main scanning direction. To be more concrete, for example, given 50 degrees as angles in FIG. 3 produced between the incident beams 17a, 17b, and 17c on the polygonal mirror 3 from the B, G, and R lasers and the deflection center directions 16a, 16b, and 16c, respectively, and the cross prism is of the size that measures 20 mm×20 mm×20 mm as described above, then a radius of the inscribed circle to the polygonal mirror 3 can be reduced 7 mm and the number of surfaces to 12. Further, by disposing the rotation center 14 of the polygonal mirror 3 at a position displaced from the center 15 of the cross prism 10 by X and Y, which are given as X=Y=2.85 mm, it is possible to achieve the most appropriate layout for beams to be scanned equally on both sides about the deflection center directions 16a, 16b, and 16c. In this instance, the polygonal mirror 3 will not fall outside the cross prism 10, and therefore does not determine the apparatus size.

Second Embodiment

Figure 4:
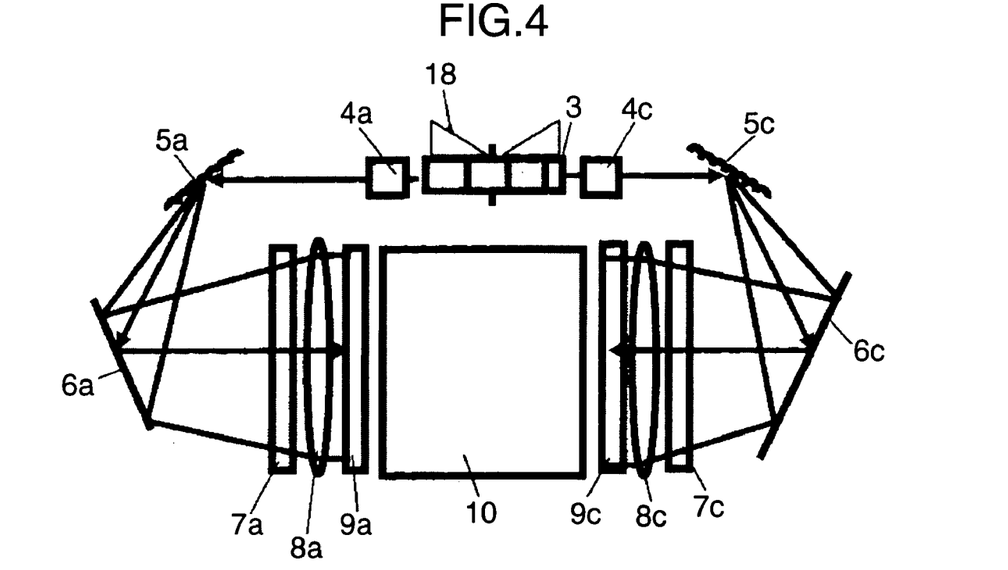
FIG. 4 is a side view schematically showing the configuration of an image forming apparatus according to a second embodiment of the invention.

A second embodiment of the invention will now be described. This embodiment is configured to achieve a releasing mechanism by a simple configuration in the image forming apparatus of the first embodiment above. FIG. 4 is a side view schematically showing the configuration of an image forming apparatus of this embodiment.

When an image forming apparatus, such as a projector, is reduced in size, it is normal that the surface area of the apparatus becomes smaller, which makes it important to release heat inside the apparatus. Additionally providing a fan for this purpose, however, is contrary to a reduction in size.

For this purpose, as is shown in FIG. 4, the image forming apparatus of this embedment is further provided with a fan 18 attached to the polygonal mirror 3. The fan 18 rotates at a high speed integrally with the polygonal mirror 3 and creates a current of air by rotating at a high speed for releasing heat generated inside the apparatus to outside the apparatus. In this embodiment, the polygonal mirror 3 is disposed above or below the multiplexing member 10 and located at the center of the apparatus. Accordingly, a current of air created by rotations of the fan 18 attached integrally with the polygonal mirror 3 is circulated around entirely inside the apparatus from the center of the apparatus. Consequently, heat generated inside the apparatus is released to outside the apparatus efficiently. Further, because the fan 18 is rotated by rotations of the polygonal mirror 3, there is no need to separately provide an exclusive-use driving mechanism for rotating the fan 18. A heat releasing mechanism can be thus achieved by an inexpensive configuration.

Third Embodiment

Figure 5:
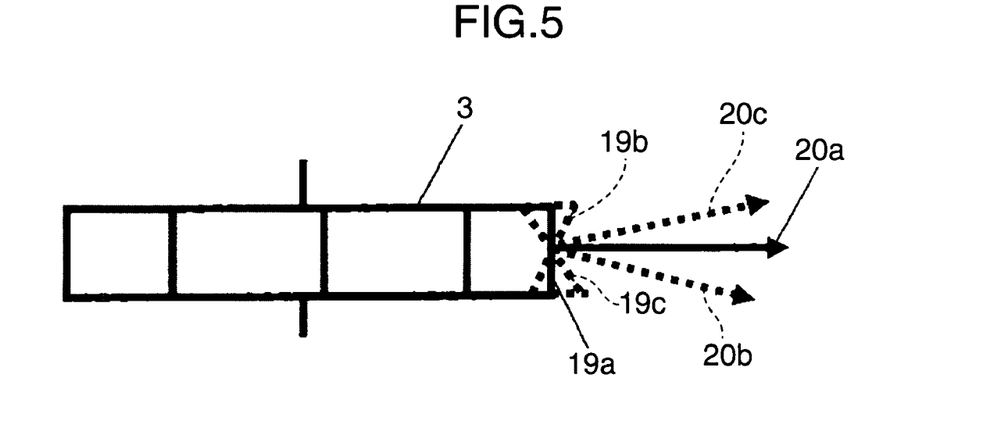
FIG. 5 is an enlarged side view of a polygonal mirror used in an image forming apparatus according to a third embodiment of the invention.

A third embodiment of the invention will now be described. This embodiment is configured to remove speckle noises using optical face tangle errors occurring in the reflection surfaces of the polygonal mirror in the image forming apparatus of the first and second embodiments above. FIG. 5 is an enlarged side view of a polygonal mirror used in an image forming apparatus of this embodiment. Hereinafter, a method of removing speckle noises using optical face tangle errors of the polygonal mirror 3 will be described using FIG. 5.

As is shown in FIG. 5, the polygonal mirror 3 is processed in the fabrication sequence so that the reflection surfaces and the rotation axis become almost parallel to each other. However, it is normal that minor tangle errors occur in the reflection surfaces. For example, a reflection surface 19a is almost parallel to the rotation axis, whereas a downward tangle error occurs in a reflection surface 19b and an upward tangle error occurs in a reflection surface 19c. These errors are generally referred to as optical face tangle errors. In the presence of optical face tangle errors as above in the reflection surfaces of the polygonal mirror 3, as is shown in FIG. 5, optical paths of beams reflected on the respective reflection surfaces 19a, 19b, and 19c of the polygonal mirror 3 are slightly displaced in a vertical direction. For example, a beam reflected on the reflection surface 19a travels almost horizontally in a direction 20a, whereas a beam reflected on the reflection surface 19b travels downward in a direction 20b and a beam reflected on the reflection surface 19c travels upward in a direction 20c.

As the polygonal mirror 3 rotates and scans beams in this state, beams are scanned in the main scanning direction while the optical paths are displaced in the vertical direction (the thickness direction of the polygonal mirror 3) by amounts comparable to optical face tangle errors in the corresponding surfaces, which causes irradiation areas on the corresponding diffusers 7a, 7b, and 7c to be displaced. The speckle noise pattern thus varies on each of the reflection surfaces 19a, 19b, and 19c. This reduces visually recognizable speckle noises. To be more concrete, it is known that speckle noises are hardly visually recognized when a position varies by about 200 μm the diffusers 7a, 7b, and 7c. Given 50 mm as a distance from the polygonal mirror 3 to each of the diffusers 7a, 7b, and 7c, then the speckle noises are hardly visually recognized in the presence of an optical face tangle error of about 0.12° within one rotation of the polygonal mirror 3. This configuration also makes it possible to achieve a significant effect because speckles of plural beams can be reduced at a time by merely tuning the accuracy of optical face tangle errors of the single polygonal mirror 3.

Fourth Embodiment

A fourth embodiment of the invention will now be described. This embedment is configured to remove speckle noises by oscillating members forming the optical system in the image forming apparatus of the first and second embodiments above.

In an image forming apparatus of this embodiment, speckle noises can be reduced by oscillating, either vertically or horizontally, one or more than one member from the cylindrical lenses 4a, 4b, and 4c, the cylindrical mirror arrays 5a, 5b, and 5c, the mirrors 6a, 6b, and 6c, the diffusers 7a, 7b, and 7c, and the field lenses 8a, 8b, and 8c disposed, respectively, in optical paths for B, G, and R in FIGS. 1 and 2. Even in the absence of optical face tangle errors in the reflection surfaces of the polygonal mirror 3 shown in FIG. 5, it is still possible to reduce visually recognizable speckle noises by varying the speckle pattern by oscillating any of the foregoing members. In the case of plural beams, however, a member has to be oscillated in each optical path. It is therefore necessary to provide a component, such as a motor, that oscillates the member in each optical path or to configure in such a manner that members to be oscillated in the respective optical paths are moved in association by a single motor or the like.

In this embodiment, optical face tangle errors of the polygonal mirror 3 may be tuned at the same time as in the third embodiment. When configured in this manner, speckle noises can be reduced further.

Figure 6:
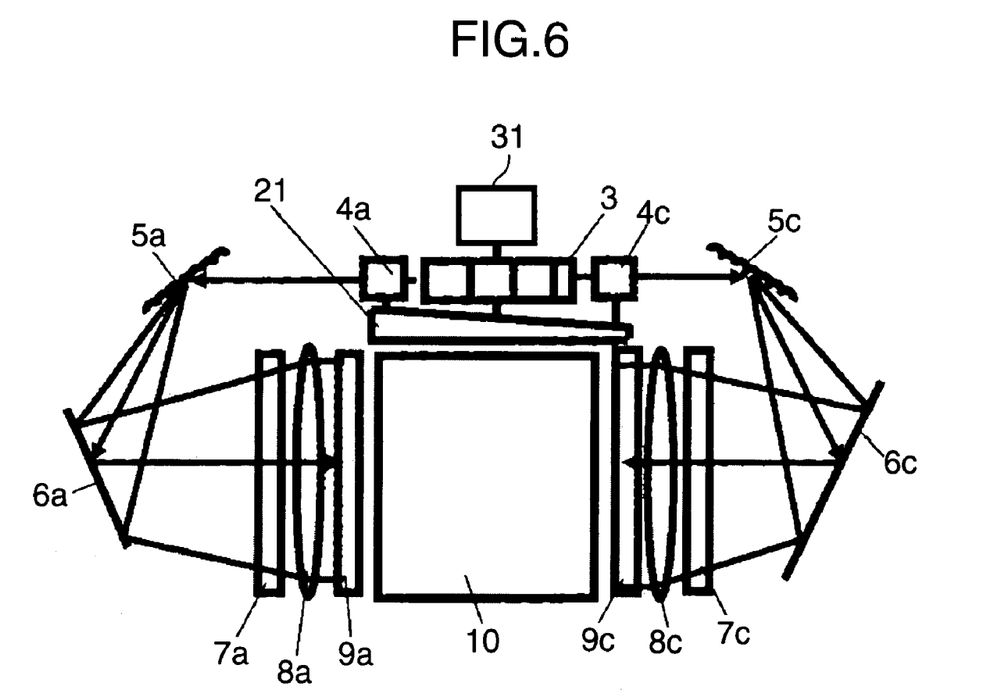
FIG. 6 is a side view schematically showing the configuration of an image forming apparatus according to a fourth embodiment of the invention.

In this embodiment, the motor to oscillate the members to be oscillated as above may also serve as the motor of the polygonal mirror 3. For example, as is shown in FIG. 6, a disc-shaped member 21 in which a thickness varies in the circumferential direction is attached to the rotation axis of the polygonal mirror 3, so that the cylindrical lenses 4a, 4b, and 4c right behind the polygonal mirror 3 move up and down in association with the thickness of the member 21. The polygonal mirror 3 is driven to rotate by a drive portion 31 having a motor connected to the rotation axis of the polygonal mirror 3. When configured in this manner, the member 21 rotates in association with the polygonal mirror 3 when it rotates, and the cylindrical lenses 4a, 4b, and 4c oscillate vertically in association with the rotations of the member 21. Owing to such oscillations, the optical paths vary and so does the speckle pattern, which consequently reduces the speckle noises. It is thus possible to reduce the speckle noises further with ease at low costs without having to additionally provide a new motor.

Fifth Embodiment

Figure 7:
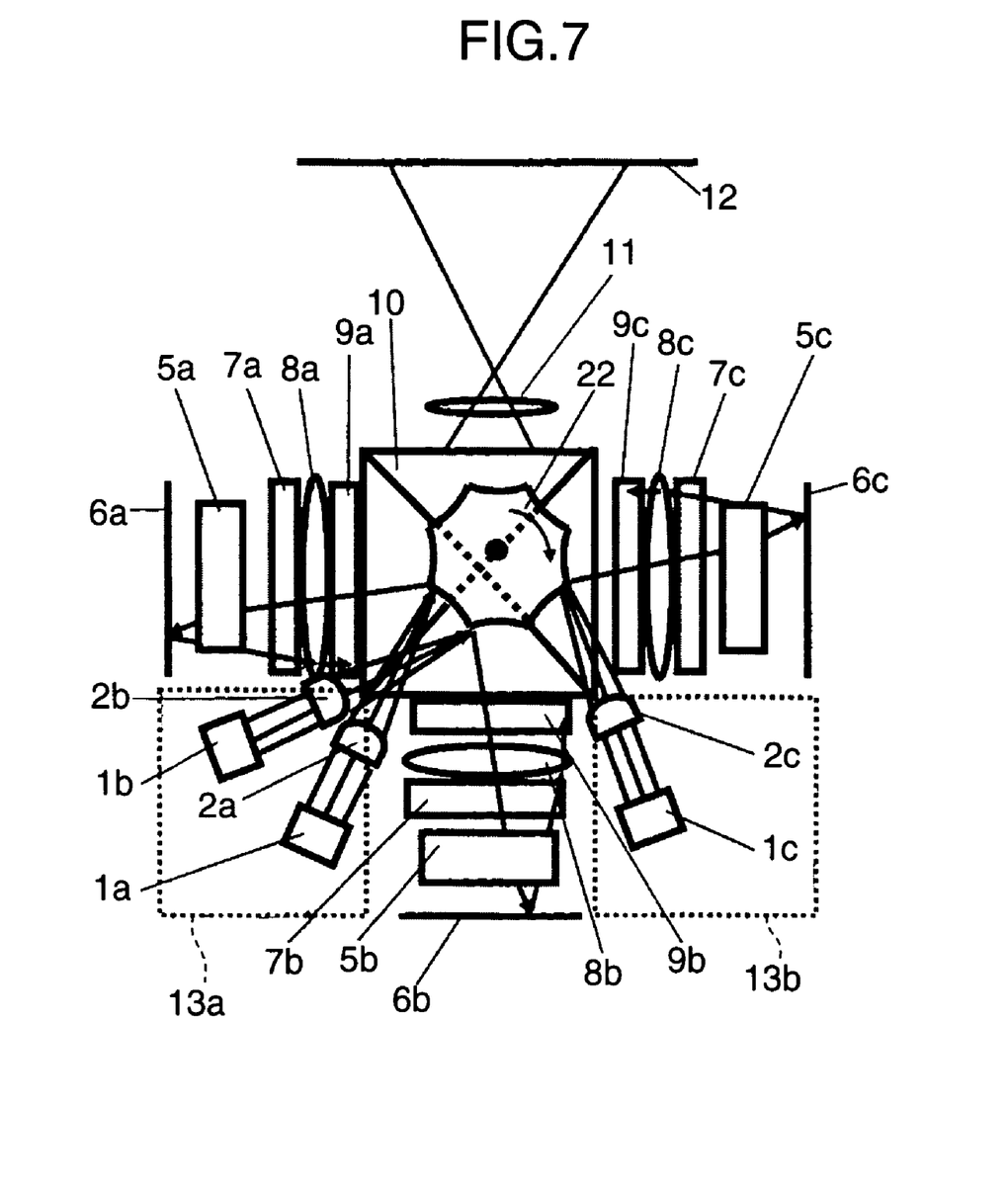
FIG. 7 is a top view schematically showing the configuration of an image forming apparatus according to a fifth embodiment of the invention.

A fifth embodiment of the invention will now be described. In the first embodiment above, reflected beams on the reflection surfaces of the polygonal mirror 3 are changed again to almost parallel beams by the cylindrical lenses 4a, 4b, and 4c, after which the beams are guided to the multiplexing member 10. In this embodiment, the cylindrical lenses 4a, 4b, and 4c used in the first embodiment above are omitted by changing beams to almost parallel beams when the beams are reflected on the reflection surfaces of the polygonal mirror 3. FIG. 7 is a top view schematically showing the configuration of an image forming apparatus of this embodiment.

As is shown in FIG. 7, a polygonal mirror 22 of this embodiment has reflection surfaces each having a specific curvature in the main scanning direction. Laser beams emitted from the laser light sources 1a, 1b, and 1c are focused in the main scanning direction of the polygonal mirror 22 by the cylindrical lenses 2a, 2b, and 2c, respectively, and the beams thus focused are changed to almost parallel beams when reflected on the reflection surfaces of the polygonal mirror 22. When configured in this manner, it is possible to omit the cylindrical lenses 4a, 4b, and 4c right behind the polygonal mirror 3, which are essential in the first embodiment above. Because the scanning speed is increased at the scanning ends on the spatial light modulators 9a, 9b, and 9c, the exposure intensity becomes less homogeneous. Nevertheless, this configuration can contribute to a reduction of the number of components because the cylindrical lenses 4a, 4b, and 4c provided for the laser light sources 1a, 1b, and 1c, respectively, can be omitted.

Sixth Embodiment

Figure 8:
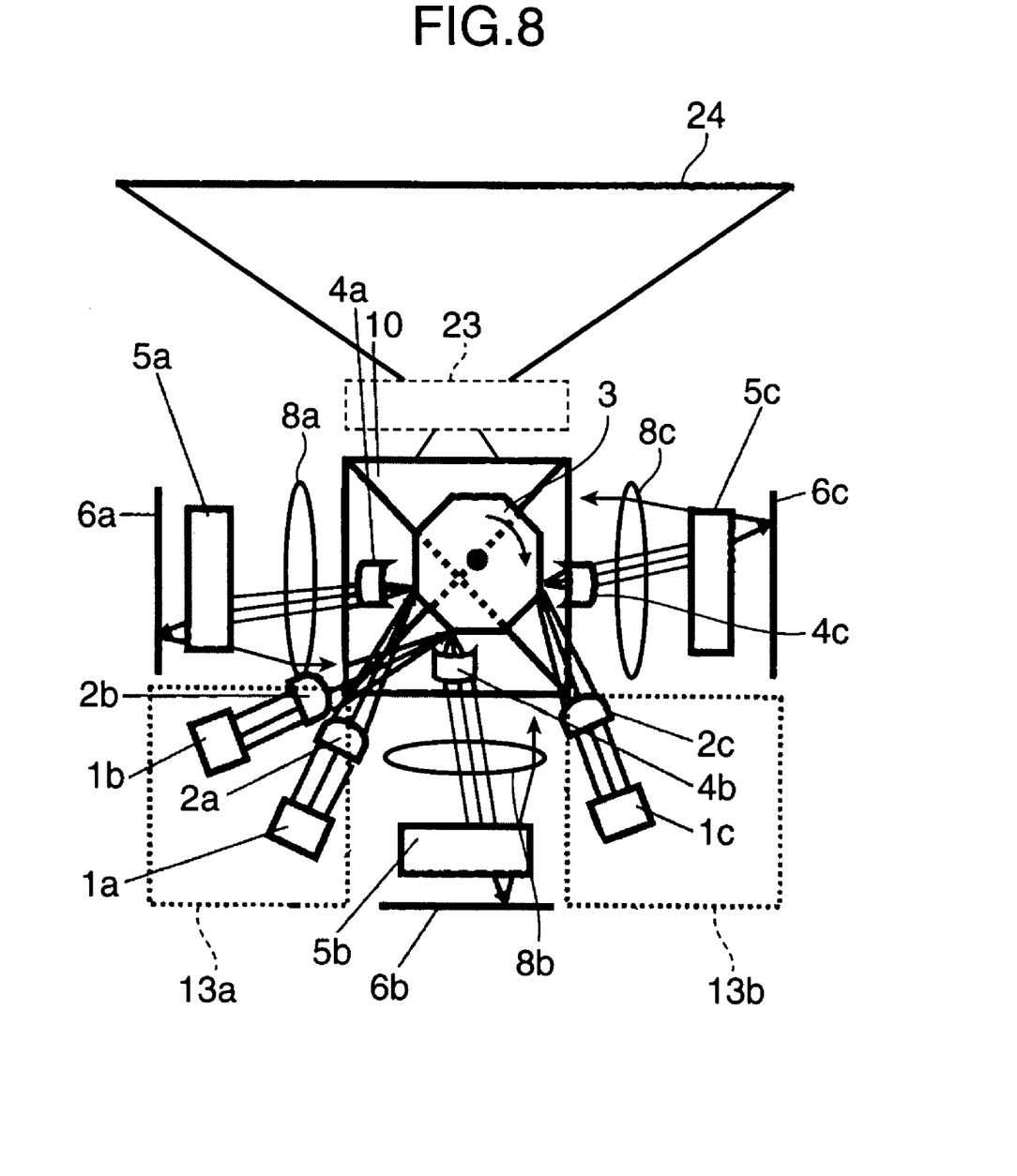
FIG. 8 is a top view schematically showing an image forming apparatus according to a sixth embodiment of the invention.

The first through fifth embodiments above have described a case where a display device, such as a projector, that projects an image onto a screen, is used as the image forming apparatus. It should be appreciated, however, that the invention is not limited to this case. For example, the invention may be applied to a liquid crystal display apparatus that illuminates the liquid crystal display screen from behind. FIG. 8 schematically shows the configuration of an image forming apparatus according to a sixth embodiment of the invention.

In the image forming apparatus in this embodiment, as is shown in FIG. 8, laser beams emitted from the laser light sources 1a, 1b, and 1c go incident on the polygonal mirror 3 in a state where they are converged in the corresponding main scanning direction by the cylindrical lenses 2a, 2b, and 2c. Beams reflected on the reflection surfaces of the polygonal mirror 3 are scanned in the main scanning direction.

Beams reflected on the polygonal mirror 3 are returned to almost parallel beams by the corresponding cylindrical lenses 4a, 4b, and 4c. The beams changed to almost parallel beams are reflected on the corresponding cylindrical mirror arrays 5a, 5b, and 5c and headed toward the corresponding mirrors 6a, 6b, and 6c disposed on the first floor. The beams reflected on the mirrors 6a, 6b, and 6c are changed to telecentric beams by the corresponding field lenses 8a, 8b, and 8c, after which they are combined in the multiplexing member 10 to be irradiated to a liquid crystal display panel unit 24 by an illumination optical system 23.

As has been described, according to the first through sixth embodiments of the invention above, it is possible to achieve a size reduction and a countermeasure against speckles for an image forming apparatus, such as a projector, at the same time by a simple and inexpensive configuration.

From the respective embodiments above, the invention can be summarized as follows. That is to say, an image forming apparatus according to an aspect of the invention includes: a plurality of laser light sources; a polygonal mirror that scans plural laser beams from the plurality of laser light sources; and a multiplexing member that combines the plurality of laser beams scanned by the polygonal mirror, wherein an extension of a rotation axis of the polygonal mirror passes through the multiplexing member.

With the image forming apparatus configured as above, it is possible to achieve a significant reduction of the apparatus size by the layout in which the extension of the rotation axis of the polygonal mirror that scans laser beams from the plural laser light sources passes through the multiplexing member. Further, by scanning plural laser beams by a single polygonal mirror, it is possible to remove speckle noises caused by plural laser beams efficiently without interfering with a reduction of the apparatus size.

It is preferable that the extension of the rotation axis of the polygonal mirror is displaced from a center position of the multiplexing member by a specific distance, so that respective optical paths of the plurality of laser beams have substantially equal distances from the polygonal mirror to the multiplexing member.

In this case, by displacing the extension of the rotation axis of the polygonal mirror from the center position of the multiplexing member by a specific distance, it is possible to make the respective optical paths of the plural laser beams from the polygonal mirror to the multiplexing member almost equal. Hence, because each optical path has no redundancy, the apparatus size can be reduced further.

It is preferable to further include a plurality of collective elements that are disposed in close proximity to the polygonal mirror on respective optical paths from the a plurality of laser light sources to the polygonal mirror such that each collective element focuses a laser beam exiting from the corresponding laser light source in a scanning direction of the laser beam by the polygonal mirror and outputs the laser beam exiting therefrom on reflection surfaces of the polygonal mirror.

In this case, by focusing laser beams that go incident on the polygonal mirror within the reflection surfaces of the polygonal mirror, it is possible to reduce the size and the number of reflection surfaces of the polygonal mirror. The apparatus size can be therefore reduced further.

It is preferable to further include a plurality of spatial light modulators that are disposed on the respective optical paths of the plurality of laser beams from the polygonal mirror to the multiplexing member, each spatial light modulator irradiated with one of the plurality of laser beams scanned by the polygonal mirror such that each of the plurality of laser beams scanned by the polygonal mirror is changed to a beam substantially perpendicular to an irradiation surface of the corresponding spatial light modulator in close proximity to the polygonal mirror so as to keep a moving speed of an irradiation position of the laser beam irradiated to the irradiation surface of the spatial light modulator constant across the irradiation surface.

In this case, by changing a laser beam scanned by the polygonal mirror to a beam almost perpendicular to the irradiation surface of the spatial light modulator, it is possible to keep the moving speed of the irradiation position of the laser beam on the irradiation surface of the spatial light modulator constant. An increase of the moving speed of the irradiation position at the ends of the irradiation surface of the spatial light modulator can be therefore suppressed, which can in turn enhance the homogeneity in modulation across the irradiation surface.

It is preferable to further include a plurality of beam parallelizing elements that are disposed in close proximity to the polygonal mirror on the respective optical paths from the polygonal mirror to the multiplexing member in such a manner that each beam parallelizing element changes an incident laser beam therein to a beam substantially perpendicular to the irradiation surface of the corresponding spatial light modulator.

In this case, by disposing the light parallelizing element on each optical path, it is possible to change the laser beam to a beam almost perpendicular to the irradiation surface of the spatial light modulator. The need to provide a complex optical system separately is thus eliminated, and the apparatus size can be reduced.

It is preferable that each reflection surface of the polygonal mirror has a specific curvature in the scanning direction of the laser beam by the polygonal mirror, and that the specific curvature is set so that a beam reflected on the reflection surface is changed to a beam substantially perpendicular to the irradiation surface of the corresponding spatial light modulator.

In this case, by providing a specific curvature to the reflection surfaces of the polygonal mirror, it is possible to change the laser beam to a beam almost perpendicular to the irradiation surface of the spatial light modulator. The need to provide a complex optical system separately is thus eliminated, and the apparatus size can be reduced.

It is preferable to further include a heat releasing fan provided to the polygonal mirror in such a manner that the heat releasing fan rotates integrally with the polygonal mirror.

In this case, as the heat releasing fan rotates in association with the rotations of the polygonal mirror, it is possible to take heat generated inside from the apparatus without having to separately provide an exclusive-use rotary drive portion for the heat releasing fan. Hence, not only is it possible to reduce the apparatus size, but it is also possible to reduce extra power consumption.

It is preferable that a range of variations in amounts of optical face tangle error in reflection surfaces of the polygonal mirror is 0.12 degree or greater.

In this case, because the optical path of the laser beam varies by an optical face tangle error in the reflection surface of the polygonal mirror, it is possible to make the speckle noises less visually recognizable by the viewer.

It is preferable to further include a plurality of optical systems that are disposed on respective optical paths of the plurality of laser beams from the polygonal mirror to the multiplexing member such that each optical system has a plurality of optical elements for propagating the corresponding laser beam and at least one of the plurality of optical elements oscillates in a direction substantially perpendicular to a propagating direction of the corresponding optical path.

In this case, because the optical path of the laser beam varies with oscillations of the optical element disposed on each optical path, it is possible to make the speckle noises less visually recognizable by the viewer.

It is preferable to further include a drive portion that rotates the polygonal mirror in such a manner that the optical element that is to oscillate is connected to the drive portion and is thereby oscillated by the drive portion.

In this case, it is possible to reduce the speckle noises by oscillating the optical element in association with the rotations of the polygonal mirror without having to separately provide an exclusive-use drive portion for oscillating the optical element. Hence, not only is it possible to reduce the apparatus size, but it is also possible to reduce extra power consumption.

It is preferable that the plurality of laser beams from the plurality of laser light sources go incident on the polygonal mirror from a periphery of the polygonal mirror in directions that differ from one another, and that the plurality of laser light sources are disposed by setting exiting directions of the plurality of laser beams such that a laser beam passing a center position of a scan range of the laser beam scanned by the polygonal mirror reaches a center position of the irradiation surface of the corresponding spatial light modulator.

In this case, it becomes easier to design the optical system disposed on each optical path from the polygonal mirror to the multiplexing member. More specifically, it is sufficient to design the optical system such that the scanning direction of a laser beam scanned by the polygonal mirror becomes symmetrical with respect to the center direction of the scan range of the laser beam.

It is preferable to further include a liquid crystal display panel that shows an image thereon as the laser beams are combined by the multiplexing member and then irradiated thereon.

In this case, it is possible to achieve a liquid crystal display device in which both the apparatus size and the speckle noises are reduced.

It is preferable that the multiplexing member is a cross prism.

In this case, it is possible to reduce the size of a projection optical system that combines plural laser beams to be projected onto the screen.

It is preferable that the multiplexing member is formed of two dichroic mirrors crossed each other at a specific angle.

In this case, it is possible to reduce the size of a projection optical system that combines plural laser beams to be projected onto the screen.

It is preferable that the polygonal mirror is disposed one of above and below the multiplexing member.

In this case, the apparatus size can be reduced more effectively.

This application is based on Japanese patent application No. 2006-246493 filed in Japan, the contents of which are hereby incorporated by references.

As this invention may be embodied in several forms without departing from spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by claims.

What is claimed is:

1. An image forming apparatus, comprising:
   a plurality of laser light sources;
   a polygonal mirror that scans a plurality of laser beams from the plurality of laser light sources; and
   a multiplexing member that combines the plurality of laser beams scanned by the polygonal mirror,
   wherein an extension of a rotation axis of the polygonal mirror passes through the multiplexing member.

2. The image forming apparatus according to claim 1, wherein:
   the extension of the rotation axis of the polygonal mirror is displaced from a center position of the multiplexing member by a specific distance, so that respective optical paths of the plurality of laser beams have substantially equal distances from the polygonal mirror to the multiplexing member.

3. The image forming apparatus according to claim 1, further comprising:
   a plurality of collective elements that are disposed in close proximity to the polygonal mirror on respective optical paths from the plurality of laser light sources to the polygonal mirror,
   wherein each collective element focuses a laser beam exiting from the corresponding laser light source in a scanning direction of the laser beam by the polygonal mirror and outputs the laser beam exiting therefrom on reflection surfaces of the polygonal mirror.

4. The image forming apparatus according to claim 3, further comprising:
   a plurality of spatial light modulators that are disposed on the respective optical paths of the plurality of laser beams from the polygonal mirror to the multiplexing member, each spatial light modulator irradiated with one of the plurality of laser beams scanned by the polygonal mirror,
   wherein each of the plurality of laser beams scanned by the polygonal mirror is changed to a beam substantially perpendicular to an irradiation surface of the corresponding spatial light modulator in close proximity to the polygonal mirror so as to keep a moving speed of an irradiation position of the laser beam irradiated to the irradiation surface of the spatial light modulator constant across the irradiation surface.

5. The image forming apparatus according to claim 4, further comprising:
a plurality of beam parallelizing elements that are disposed in close proximity to the polygonal mirror on the respective optical paths from the polygonal mirror to the multiplexing member,
wherein each beam parallelizing element changes an incident laser beam therein to a beam substantially perpendicular to the irradiation surface of the corresponding spatial light modulator.

6. The image forming apparatus according to claim 4, wherein:
each reflection surface of the polygonal mirror has a specific curvature in the scanning direction of the laser beam by the polygonal mirror; and
the specific curvature is set so that a beam reflected on the reflection surface is changed to a beam substantially perpendicular to the irradiation surface of the corresponding spatial light modulator.

7. The image forming apparatus according to claim 1, further comprising:
a heat releasing fan provided to the polygonal mirror;
wherein the heat releasing fan rotates integrally with the polygonal mirror.

8. The image forming apparatus according to claim 1, wherein:
a range of variations in amounts of each optical face tangle error in reflection surfaces of the polygonal mirror is 0.12 degree or greater.

9. The image forming apparatus according to claim 1, further comprising:
a plurality of optical systems that are disposed on respective optical paths of the plurality of laser beams from the polygonal mirror to the multiplexing member,
wherein each optical system has a plurality of optical elements for propagating the corresponding laser beam, and at least one of the plurality of optical elements oscillates in a direction substantially perpendicular to a propagating direction of the corresponding optical path.

10. The image forming apparatus according to claim 9, further comprising:
a drive portion that rotates the polygonal mirror,
wherein the optical element that is to oscillate is connected to the drive portion and is thereby oscillated by the drive portion.

11. The image forming apparatus according to claim 4, wherein:
the plurality of laser beams from the plurality of laser light sources go incident on the polygonal mirror from a periphery of the polygonal mirror in directions that differ from one another; and
the plurality of laser light sources are disposed by setting exiting directions of the plurality of laser beams such that a laser beam passing a center position of a scan range of the laser beam scanned by the polygonal mirror reaches a center position of the irradiation surface of the corresponding spatial light modulator.

12. The image forming apparatus according to claim 1, further comprising:
a liquid crystal display panel that shows an image thereon as the laser beams are combined by the multiplexing member and then irradiated thereon.

13. The image forming apparatus according to claim 1, wherein:
the multiplexing member is a cross prism.

14. The image forming apparatus according to claim 1, wherein:
the multiplexing member is formed of two dichroic mirrors crossed each other at a specific angle.

15. The image forming apparatus according to claim 1, wherein:
the polygonal mirror is disposed one of above and below the multiplexing member.

* * * * *